Patented June 26, 1934

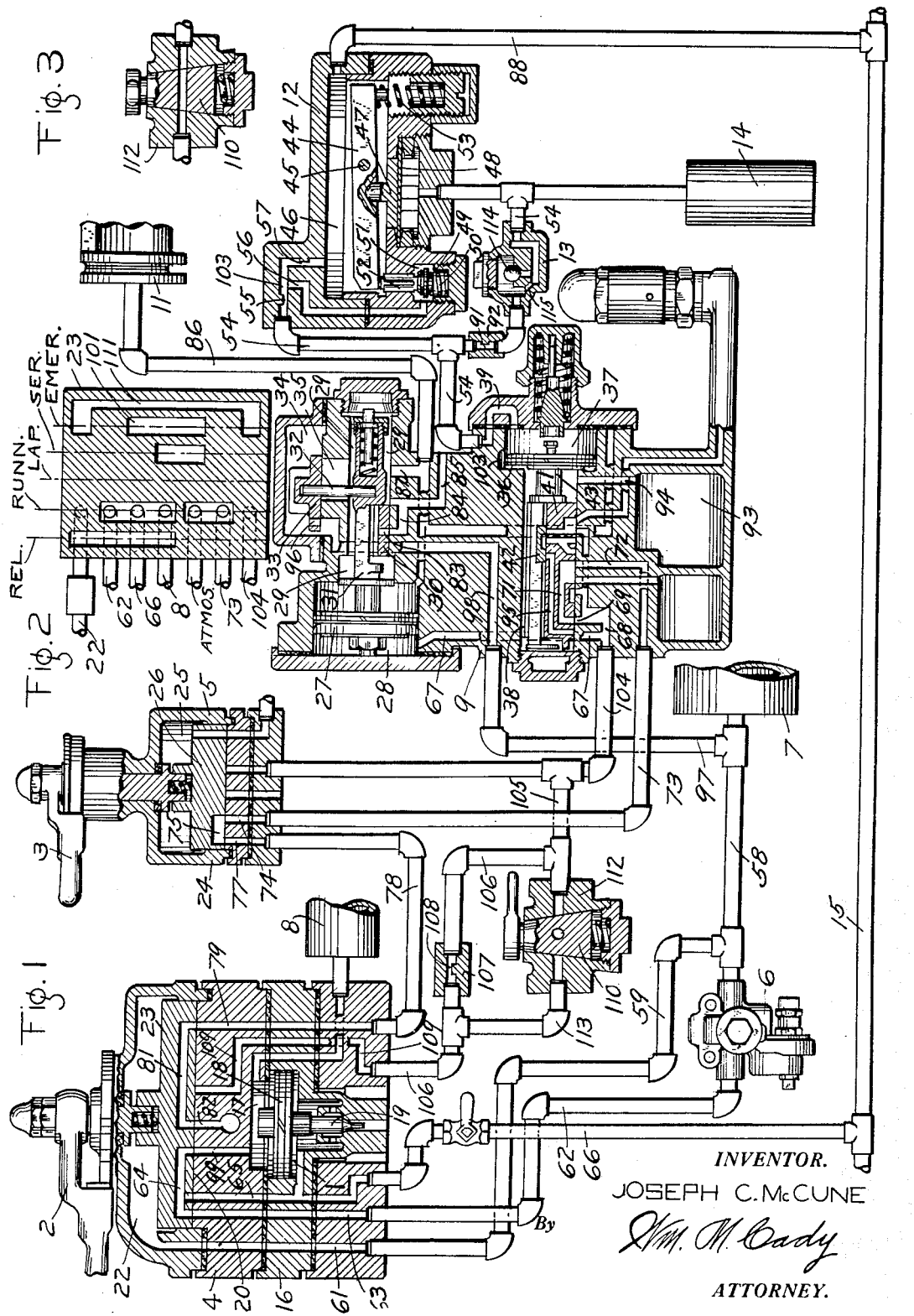

1,964,069

UNITED STATES PATENT OFFICE 1,964,069

FLUID PRESSURE BRAKE

Joseph C. McCune, Edgewood, Pa., assignor to The Westinghouse Air Brake Company, Wilmerding, Pa., a corporation of Pennsylvania Application December 19, 1931, Serial No. 582,005

21 Claims. (Cl. 303—40)

This invention relates to fluid pressure brakes and more particularly to a fluid pressure brake equipment in which an emergency application of the brakes on the cars of a train is effected upon a sudden reduction in brake pipe pressure.

When the brakes are applied on a train by effecting a reduction in brake pipe pressure, the brakes will apply on cars at the front end of the train before they apply on cars at the rear of the train, and when the brake pipe pressure is reduced at an emergency rate, the brakes are applied on cars at the head end of the train, before the brakes commence to apply on cars at the rear end of the train, with such force as to cause the slack in the train to run in so abruptly as to cause excessive shocks.

Since the locomotive is much heavier than any of the cars of the train, the retarding effect produced by applying the brakes on the locomotive is much greater than that produced when the brakes are applied on a car of the train and consequently, if an emergency application of the brakes on the locomotive is made simultaneously with that of the cars in the train, the retarding action of the brakes at the front of the train is greatly increased, and the shock incident to the running in of the slack is more severe.

It is, therefore, desirable to retard the application of the brakes on the locomotive when an emergency application of the train brakes is made until the slack has run in and then to apply the locomotive brakes with such force as the occasion demands.

It is an object of this invention to provide means applicable to the standard brake equipment of the locomotive, for retarding the application of the brakes on the locomotive with respect to the cars of the train when an emergency application of the brakes is effected while permitting the brakes to be applied on the locomotive at the same time the brakes are applied on the cars of the train when a service application of the brakes is initiated.

A further object of the invention is to provide brake retarding apparatus having the above noted characteristics that may readily be applied to standard brake and distributing valve devices on the locomotive brake equipment without necessitating alterations thereof except in small details and minor pipe connections.

These and other objects of the invention that will be made apparent throughout the further description thereof are attained by means of the apparatus hereinafter described and illustrated in the accompanying drawing, wherein:

Fig. 1 is a diagrammatic view, partly in section, of a locomotive fluid pressure brake equipment embodying my invention;

Fig. 2 is a sectional development of a brake valve device; and

Fig. 3 is a sectional view of a plug valve device shown in the open position.

Referring to the drawing, the invention includes an engineer's automatic brake valve device 4, an engineer's independent brake valve device 5, the usual feed valve device 6, main and equalizing reservoirs 7 and 8 respectively, distributing valve device 9, brake cylinder 11, a retarding valve device 12, a check valve device 13, a retarding reservoir 14, and a train brake pipe 15.

The retarding valve device is responsive to variations in brake pipe pressure and serves to so control the operation of the distributing valve device which controls the locomotive brakes, that when a reduction in brake pipe pressure is made at a service rate, the distributing valve device operates in the usual manner and effects a service application of the brakes on the locomotive coincident with such application of the brakes on the cars of the train, but when a reduction in brake pipe pressure at an emergency rate is occasioned, the distributing valve device is rendered unresponsive thereto and consequently the brakes are initially applied only on the cars of the train.

The engineer's automatic brake valve device is of the usual construction and comprises a casing 16 having a piston cylinder containing an equalizing piston 18 which operates a brake pipe discharge valve 19. The chamber 17 at one side of the piston 18 is in communication with the equalizing reservoir 8, and the chamber 1 at the opposite side is open to the brake pipe 15 so that when the pressure in chamber 17 is reduced, the piston 18 is operated to unseat the valve 19 and thus vent fluid under pressure from the brake pipe.

The casing 16, which is of the usual sectional type, is also provided with a rotary valve chamber 22 containing a rotary valve 23 adapted to be operated by a handle 2 for controlling the delivery of fluid under pressure to part of the apparatus to be hereinafter described and which communicates with the valve seat 20 through passages which terminate in the seat and register with various passages and ports in the rotary valve, as will hereinafter appear.

The engineer's independent brake valve device comprises a casing 24 having a rotary valve chamber 25 containing a rotary valve 26 adapted to be operated by a handle 3 and having ports and passages which register with passages in the casing 24 and which communicate with pipes leading to various parts of the equipment, as will hereinafter appear.

The distributing valve device 9 comprises a casing containing an application and release portion and an equalizing portion. The application and release portion comprises a piston 27 having an application cylinder 28 at one side. The valve chamber 29 at the opposite side of the piston contains a release slide valve 30 adapted to be operated by piston 27 through a stem 31. A pin 32 secured to the stem 31 is adapted to operate a supply valve 33 mounted in the valve chamber 34, the valve 33 controlling communication from the valve chamber 34 through passage 35 to the valve chamber 29.

The equalizing portion comprises a piston 36, having a chamber 37 at one side open to passage 39 and a valve chamber 38 at the opposite side containing a main slide valve 41 and a graduating slide valve 42 adapted to be operated through stem 43 by the piston 36.

The retarding valve device 12 may comprise a rocking lever 44, pivotally mounted on a shaft 45 in a chamber 46 and is engaged centrally by a pivot block 47 mounted on the upper face of a flexible diaphragm 48. The lever 44 is adapted to operate a valve 49 disposed in the valve chamber 51, one end of the lever being arranged to engage the end of a fluted stem 52 carried by the valve 49, the other end of the lever being subject to the pressure of a coil spring 53, which normally tends to retain the valve 49 in open position.

The valve 49 when open, establishes communication from pipe 54 by way of restricted passage 55 in passage 103 and passage 56, valve chamber 51, past the valve seat to the chamber 46, and when the valve 49 is closed, communication is established from the pipe 54 through both restricted passages 55 and 57 in passage 103 to the chamber 46.

As indicated in Fig. 1, the parts of the equipment occupy the positions in which they are maintained while the automatic brake valve device 4 and the independent brake valve device 5 are in the running position. Fluid under pressure is supplied to the rotary valve chamber 22 in the automatic brake valve device from the main reservoir 7 through pipes 58 and 59 and passage 61.

In operation, with the automatic brake valve device in running position, as shown, the brake pipe 15 is maintained charged with fluid at the standard pressure carried in the system by the usual operation of the feed valve device 6, that is connected to the main reservoir 7 by the pipe 58 and which supplies fluid under pressure to the brake pipe through pipe 62, passage 63 in the automatic brake valve device, passage 64 in the rotary valve 23, passage 65 in the brake valve device and pipe 66.

The brake pipe being charged with fluid under pressure, the equalizing piston 36 of the distributing valve device is maintained in release position shown and the slide valves are held in release position in which the application cylinder 28 is connected to the atmosphere through passage 67, passage 68, passage 69, passage 71 in the main slide valve 41, passage 72, pipe 73, passage 74, cavity 75 in the rotary valve 26 of the independent brake valve device 5, passage 77, pipe 78, passage 79 in the automatic brake valve device, passage 81 in the rotary valve 23 of the automatic brake valve device and passage 82 to atmosphere.

The application cylinder 28 being at atmospheric pressure, the application piston 27 is maintained in release position in which the release slide valve 30 connects valve chamber 29 with the atmosphere through port 83 in the release slide valve, passages 84 and 85 to atmosphere. Consequently, the brake cylinder 11 is open to the atmosphere through pipe 86 and passage 87, which opens into the valve chamber 29.

The chamber 46 of the retarding valve device 12 is charged with fluid under pressure from the brake pipe 15 by way of pipe 88 and the valve 49 being held open by spring 53, the chamber is normally charged at a rapid rate.

When the brake valve device 4 is in the running position, the ports and passages are connected as indicated in the sectional development view, Fig. 2, the valve there being shown in the running position.

As previously indicated, the brakes on the locomotive may be applied coincident with the application of the brakes on the cars of the train when a service application is made, but it is desirable to retard the application of the brakes or to apply the brakes slowly on the locomotive during an emergency application of the brakes on the train until a short interval after the brakes on the cars of the train have been fully applied, in order to reduce the shock incident to the running in of the slack of the cars of the train. After the slack in the cars has run in, the brakes on the locomotive may be applied by a direct air application, as will hereinafter appear.

When a service application of the brakes is made the automatic brake valve device is moved to the service position, in which position, fluid under pressure is vented from the equalizing reservoir 8 of the equalizing piston chamber 17 as indicated in the development diagram, Fig. 2. The higher brake pipe pressure acting on the under side of the piston 18 causes it to raise the valve 19 and connect chamber 1 to the atmosphere, thus causing a reduction in brake pipe pressure through the pipe 66, passage 65 and chamber 1. The pressure in the retarding valve chamber 46 is reduced at a service rate. At the same time, the pressure in the retarding reservoir 14 is reduced by flow past the check valve 114 and through the restricted passage 91 in the choke fitting 92 in the pipe 54 and the restricted passage 55 in the passage 103, which restricted passages are so proportioned that flow from the reservoir 14 is limited to the service rate, so that equal pressures are maintained on opposite sides of the diaphragm 48 during a service reduction in brake pipe pressure.

The fluid pressure in the equalizing piston chamber 37 is also reduced at a service rate, by flow through pipe 54 and the restricted passage 55, passage 56 and past the open valve 49 to the chamber 46.

Fluid pressure in the equalizing valve chamber 38, which is open to the pressure chamber 93 through passage 94, moves the piston 36 to the right, thereby establishing communication between the pressure chamber 93 and the application chamber 28 through passage 94, valve chamber 38, the then uncovered passage 95 in the main slide valve 41 which registers with the passage 69, passage 68 and passage 67. The fluid under pressure thus supplied to the chamber 28 moves the piston 27 to the right, thereby bringing the port 96 of the supply valve 33 into registry with the passage 35 of the application valve device, thus permitting fluid under pressure to flow from the main reservoir 7 to the brake cylinder 11 through pipes 58 and 97, passage 98, chamber 34, port 96 in the slide valve 33, passage 35, valve chamber 29, passage 87 and pipe 86. When the pressure of fluid supplied to the valve chamber 29 and thus to the brake cylinder 11 slightly exceeds that in the application chamber 28, the piston 27 will be moved to the left by the above pressure to an intermediate or lap position wherein the slide valve 33 closes the passage 35 and retains the fluid under pressure within the brake cylinder until a subsequent release operation of the automatic brake valve device.

When it is desired to effect an emergency application of the brakes, the automatic brake valve device 4 is moved to emergency position wherein a wide open communication is established between the equalizing valve chamber 17 and the atmosphere through passage 99 and the cavity 101 in the rotary valve 23, Fig. 2.

A sudden reduction in brake pipe pressure is thus effected and consequently the pressure in the chamber 46 of the retarding valve device is reduced at a corresponding rate. This rate of reduction in pressure in chamber 46 is faster than the pressure in the retarding reservoir 14 can reduce by flow through the restricted passages 91 and 55 and consequently the pressure in chamber 46 acting on the upper face of the diaphragm 48 drops below the pressure in the retarding reservoir 14 acting on the lower face of the diaphragm. As a result, the diaphragm is flexed upwardly, moving the lever 49 against the pressure of spring 53, so that the valve 49 is permitted to move to its seat by the pressure of spring 50.

With the valve 49 seated, reduction in pressure in the piston chamber 37 can only take place at a rate as permitted by flow through the restricted passages 55 and 57. The combined flow areas of the passages 55 and 57 are such that flow from the piston chamber 37 to the chamber 46 and the brake pipe is at a less rate than fluid can flow from the valve chamber 38, through the feed groove 103 to piston chamber 37 and consequently the piston 36 will not be moved from release position when an emergency rate of reduction in brake pipe pressure is effected.

When the automatic brake valve device 4 is moved to the emergency position, communication is established between the application cylinder 28 of the distributing valve device and the valve chamber 22 of the automatic brake valve device through passages 67 and 68, pipes 104, 105 and 106, choke fitting 107 in the pipe 106 having a restricted passage 108, passage 109 and cavity 111, Fig. 2 in the rotary valve 23. The rate of flow of fluid from the main reservoir 7 to the application cylinder 28 is therefore restricted by the restricted passage 108 in the choke fitting 107, and consequently only a slow or gradual movement of piston 27 to the right takes place. The piston 27 is thus moved slowly to the right until the port 96 in the supply valve 33 registers partially with the passage 35 and permits fluid under pressure to flow from the main reservoir 7 to the valve chamber 29 and thus to the brake cylinder. The degree of opening of the port 96 is determined by the rate of flow of fluid through the restricted passage 108, the movement of the piston 27 toward the right being opposed by the pressure in the valve chamber 29.

Only a slow and gradual build up of brake cylinder pressure is permitted on the locomotive when an emergency application of the brakes is effected as determined by the rate at which fluid under pressure is supplied to the application cylinder 28 through the restricted passage 108.

It will thus be seen that while the brakes are applying at an emergency rate on the cars of the train, when an emergency application of the brakes is effected, the brakes on the locomotive are being applied only at a slow and gradual rate.

The period of time that should properly transpire before the brakes on the locomotive are applied with full force, is that sufficient to permit the running in of the slack of the train. If the train is relatively long, more time is required for the slack to run in.

In order to vary the rate at which fluid under pressure is supplied by the brake valve device in emergency position to the application cylinder 28, a plug valve device 112 having a plug valve 110 is provided in the by-pass pipe 113 around the restricted passage 108 in the choke fitting 107. For long trains, the plug valve is maintained in its closed position as shown, and the rate of increase in fluid pressure supplied to the application cylinder 28 is then determined by the restricted passage 108.

On short trains, the plug valve 110 is turned to the open position, thus furnishing an additional passage for fluid around the restriction 108 in the choke fitting 107, and permitting a more rapid flow of fluid under pressure to the application cylinder 28 which effects a more rapid movement of the piston 27 and opening of the port 96 in the supply valve, and consequently a more rapid application of the brakes on the locomotive.

The brakes of the train and locomotive are released in the usual manner by first moving the automatic brake valve device to release position wherein communication is established between the brake pipe 15 and the rotary valve chamber 22, which is always maintained at main reservoir pressure, through the passage 65 and pipe 66, and then to running position. Since the equalizing piston 36 has remained in the release position shown in Fig. 1 during the emergency application of the brakes, as the fluid pressure in the brake pipe builds up, the pressure chamber 93 is charged through pipe 88, retarding valve chamber 46, passage 103, pipe 54, passage 39, equalizing chamber 37, feed groove 103, valve chamber 38 and passage 94. It will be noted that a ball check valve 114 is provided in the check valve device 13 for preventing the charging of the retarding reservoir 14 except through the restricted passage 115. The purpose of the restriction 115 is to prevent such overcharge of the retarding reservoir 14 as would cause the pressure on the under side of the diaphragm 48 to overbalance the pressure on the upper side thereof when the brake pipe pressure is subsequently reduced as a result of moving the brake valve to the running position, which operation establishes communication between the feed valve 6 and the brake pipe 15.

An overcharged condition of the retarding reservoir 14 at this time would cause the diaphragm 48 to be flexed upwardly, thereby permitting the valve 49 to be seated. The overcharge would eventually reduce to brake pipe pressure at a rate controlled by the restricted passages 91, 55 and 57, but if in the meantime, brake pipe pressures were reduced at a service rate to effect a service application of the brakes, the equalizing piston 36 would remain in the release position because of the series related restricted passages 55 and 57 which prevent the escape of fluid from the equalizing piston chambers 37 at a rate faster than fluid can flow through the feed groove 103, as before explained. This condition would effect a hold back of the application of the locomotive brakes the same as during an emergency application thereof and this condition is not desirable. The size of the restriction 115 must be so proportioned that the retarding reservoir 14 will not be charged with pressures above the pressure in the brake pipe maintained by the feed valve 6.

Summarizing, a retarding valve device and retarding reservoir are applied to the standard fluid pressure brake controlling equipment of the locomotive and the retarding valve device so controls the operation of the distributing valve device that it permits the normal operation of the equalizing valve device in a service application of the brakes on the cars of the train and on the locomotive, but which is responsive to a reduction in brake pipe pressure at an emergency rate to so restrict the flow of fluid from the equalizing piston chamber to the brake pipe as to prevent operation of the equalizing valve device upon the occurrence of a reduction in brake pipe pressure at an emergency rate. Since the application valve device at this time, receives no operating fluid from the pressure chamber of the distributing valve device, its operation is effected by the supply of fluid under pressure from the brake valve device, which supply is restricted, so as to retard the operation of the application valve device for a predetermined period of time. Means are provided for varying the rate at which fluid under pressure is supplied by the brake valve device to the application cylinder in accordance with the length of the train. Means are also provided to prevent too rapid charging of the retarding reservoir, thereby insuring proper operation of the brake equipment under all operating conditions of the automatic and independent brake valve device.

While I have disclosed but one embodiment of my invention, it is apparent that many alterations, additions and omissions may be made in the apparatus without departing from the spirit of my invention.

Having now described my invention, what I claim as new and desire to secure by Letters Patent, is:

1. In a fluid pressure brake, the combination with a brake pipe, of a brake controlling valve device operable upon a reduction in brake pipe pressure at a service rate for effecting an application of the brakes, and valve means operable upon a sudden reduction in brake pipe pressure for preventing a reduction in brake pipe pressure on said valve device at a service rate.

2. In a fluid pressure brake, the combination with a brake pipe, of a brake controlling valve device on the locomotive of a train and operable upon a reduction in brake pipe pressure at a service rate for effecting an application of the brakes, and valve means for controlling the rate at which the brake pipe pressure on said valve device is reduced and operating upon a sudden reduction in brake pipe pressure for restricting the rate of reduction on said valve device to a degree less than the service rate.

3. In a fluid pressure brake, the combination with a brake pipe, of a brake controlling valve device on the locomotive of a train operable upon a reduction in brake pipe pressure for effecting an application of the brakes on the locomotive, valve means operable upon a sudden reduction in brake pipe pressure for preventing said valve device from operating through a reduction in brake pipe pressure, and manually controlled means for effecting a sudden reduction in brake pipe pressure and for effecting the operation of said valve device to cause a delayed application of the brakes on the locomotive.

4. In a fluid pressure brake, the combination with a brake pipe, of a reservoir, a brake controlling valve device, including a controlling piston subject to the opposing pressures of said reservoir and the brake pipe and having a feed passage through which said reservoir is charged from the brake pipe, said piston being operable when the brake pipe pressure therein is reduced at a greater rate than fluid can flow from the reservoir to the brake pipe, and valve means for controlling the rate at which the brake pipe pressure is reduced on said piston and operated upon a sudden reduction in brake pipe pressure for reducing the pressure on the brake pipe side of said piston only at a rate equal to or less than the rate at which fluid flows from said reservoir through said fluid passage to the brake pipe side of said piston.

5. In a fluid pressure brake, the combination with a brake pipe, a reservoir communicating with the brake pipe, an equalizing valve device operated upon a reduction in brake pipe pressure for effecting an application of the brakes, of a valve mechanism having a restricted opening and also a large opening through which fluid may exhaust from the equalizing valve to brake pipe and comprising a valve operable to close communication through said large opening, and means subject to the opposing pressures of the brake pipe and the said reservoir for controlling the operation of said valve.

6. In a fluid pressure brake, the combination with a brake pipe, a reservoir communicating with the brake pipe, an equalizing valve device operated upon a reduction in brake pipe pressure for effecting an application of the brakes, of a valve mechanism having a restricted opening and also a large opening through which fluid may exhaust from the equalizing valve to the brake pipe and comprising a valve operable to close communication through said large opening, a flexible diaphragm subject to the opposing pressures of the brake pipe and the said reservoir, a pivoted lever engaging the diaphragm and the valve for controlling the operation of said valve, and a spring for normally retaining the said valve in open position and permitting closure of the valve in response to movement of the said diaphragm.

7. In a fluid pressure train brake system, the combination with a brake pipe, a brake cylinder, a fluid pressure actuated valve device for controlling the delivery of fluid under pressure to the brake cylinder to effect an application of the brakes, a second fluid pressure actuated valve device responsive to a reduction in brake pipe pressure for varying the fluid pressure in said first valve device, and a manually operable valve device for controlling the delivery of fluid under pressure to the first said valve device for effecting operation of the first valve device to initiate an application of the brakes and for effecting reductions in brake pipe pressure at service and emergency rates, of a means operative upon a reduction in brake pipe pressure at an emergency rate for rendering the second valve device unresponsive to a reduction in brake pipe pressure.

8. In a fluid pressure train brake system, the combination with a brake pipe, a brake cylinder, a fluid pressure actuated valve device for controlling the delivery of fluid under pressure to the brake cylinder to effect an application of the brakes, a second fluid pressure actuated valve device responsive to a reduction in brake pipe pressure for varying the fluid pressure in said first valve device, and a manually operable valve device for effecting a reduction in brake pipe pressure at service and emergency rates and for controlling the delivery of fluid under pressure to the first valve device for effecting operation thereof at a slow rate to effect an application of the brakes at a slow rate when a reduction in brake pipe pressure at an emergency rate has been initiated thereby, of means operative upon a reduction in brake pipe pressure at an emergency rate for rendering the second valve device unresponsive to a reduction in brake pipe pressure.

9. In a fluid train brake system, the combination with a brake pipe, an application valve device for controlling the brakes, an equalizing valve device for controlling the application valve device responsive to reductions in pressure in the brake pipe for initiating an application of the brakes, and a manually operable brake valve device for effecting reductions in brake pipe pressure at service and emergency rates, of means operative upon a reduction in brake pipe pressure at an emergency rate for rendering the equalizing valve device unresponsive to a reduction in brake pipe pressure.

10. In a fluid train brake system, the combination with a brake pipe, an application valve device for controlling the brakes, an equalizing valve device for controlling the application valve device responsive to reductions in pressure in the brake pipe for initiating an application of the brakes, and a manually operable brake valve device for effecting reductions in brake pipe pressure at service and emergency rates and for effecting operation of the application valve device to initiate an application of the brakes, of means operative upon a reduction in brake pipe pressure at an emergency rate for rendering the equalizing valve device unresponsive to a reduction in brake pipe pressure.

11. In a fluid train brake system, the combination with a brake pipe, an application valve device for controlling the brakes, an equalizing valve device for controlling the application valve device responsive to reductions in pressure in the brake pipe for initiating an application of the brakes, and a manually operable brake valve device for effecting reductions in brake pipe pressure at service and emergency rates and for effecting operation of the application valve device at a slow rate to effect an application of the brakes at a slow rate when a reduction in brake pipe pressure at an emergency rate has been initiated thereby, of means operative upon a reduction in brake pipe pressure at an emergency rate for rendering the equalizing valve unresponsive to a reduction in brake pipe pressure.

12. In a fluid train brake system, the combination with a brake pipe, an application valve device for controlling the brakes, an equalizing valve device for controlling the application valve device responsive to reductions in pressure in the brake pipe for initiating an application of the brakes, and a manually operable brake valve device for effecting reductions in brake pipe pressure at service and emergency rates and for effecting operation of the application valve device, of a valve device connected between the equalizing valve device and the brake pipe and responsive to pressure variations in the brake pipe for rendering the equalizing valve device unresponsive to reduction in brake pipe pressure.

13. In a fluid train brake system, the combination with a brake pipe, an application valve device for controlling the brakes, an equalizing valve device for controlling the application valve device responsive to reductions in pressure in the brake pipe for initiating an application of the brakes, and a manually operable brake valve device for effecting reductions in brake pipe pressure at service and emergency rates and for effecting operation of the application valve device, of a valve device connected between the equalizing valve device and the brake pipe and having a passage for exhausting fluid under pressure from the equalizing valve at a service rate to effect operation of the application valve when the brake pipe pressure is reduced at a service rate, and a pressure responsive valve device operative upon reduction of brake pipe pressure at an emergency rate for restricting the said passage and for preventing the exhaust of fluid from the equalizing valve device at a rate sufficient to cause its operation when the brake pipe pressure is reduced.

14. In a fluid train brake system, the combination with a brake pipe, an application valve device for controlling the brakes, an equalizing valve device for controlling the application valve device responsive to reductions in pressure in the brake pipe for initiating an application of the brakes, and a manually operable brake valve device for effecting reductions in brake pipe pressure at service and emergency rates and for effecting operation of the application valve device, of a valve means connected between the equalizing valve device and the brake pipe for governing the operation of the equalizing valve device including a reservoir connected to the brake pipe, a diaphragm operated by fluid under pressure supplied from the said reservoir, a valve for limiting the exhaust of fluid from the equalizing valve device and the said reservoir and controlled by the said diaphragm, and means for limiting the charging rate of the said reservoir.

15. In a fluid train brake system, the combination with a brake pipe, an application valve device for controlling the brakes, an equalizing valve device for controlling the application valve device responsive to reductions in pressure in the brake pipe for initiating an application of the brakes, a manually operable brake valve device for effecting reductions in brake pipe pressure at service and emergency rates and for controlling the delivery of operating fluid to the application valve device to initiate an application of the brakes, and means for restricting the said delivery of fluid whereby the application valve device is operated at a slow rate to effect an application of the brakes at a slow rate during a reduction in brake pipe pressure at an emergency rate initiated by the brake valve device, of means responsive to brake pipe pressure reduction at an emergency rate for rendering the equalizing valve device unresponsive to a reduction in brake pipe pressure.

16. In a fluid pressure train brake system, the combination with a brake pipe, a brake cylinder, a fluid pressure actuated valve device for controlling the delivery of fluid under pressure to the brake cylinder to effect an application of the brakes, a second fluid pressure actuated valve device responsive to a reduction in brake pipe pressure for varying the fluid pressure in said first valve device, and a manually operable valve means for effecting a reduction in brake pipe pressure at service and emergency rates and having a restricted passage for delivering operating fluid at a slow rate to effect slow operation of the first said valve device to effect an application of the brakes at a slow rate when a reduction in brake pipe pressure at an emergency rate has been initiated thereby, of means operative upon a reduction in brake pipe pressure at an emergency rate for rendering the second valve device unresponsive to a reduction in brake pipe pressure.

17. In a fluid pressure brake, the combination with a brake pipe, an application valve device operated by fluid pressure for effecting an application of the brakes, and an equalizing valve device operated upon a service rate of reduction in brake pipe pressure for varying the fluid pressure on said application valve device, of means operated upon a reduction in brake pipe pressure at an emergency rate for rendering said equalizing valve device unresponsive to the reduction in brake pipe pressure, and manually controlled means for supplying fluid under pressure to said application valve device.

18. In a fluid pressure brake, the combination with a brake pipe, an application valve device operated by fluid pressure for effecting an application of the brakes, and an equalizing valve device operated upon a service rate of reduction in brake pipe pressure for varying the fluid pressure on said application valve device, of means operated upon a reduction in brake pipe pressure at an emergency rate for rendering said equalizing valve device unresponsive to the reduction in brake pipe pressure, and manually controlled means operative to effect a reduction in brake pipe pressure at an emergency rate and to supply fluid under pressure to said application valve device.

19. In a fluid pressure brake, the combination with a brake pipe, an application valve device operated by fluid pressure for effecting an application of the brakes, and an equalizing valve device operated upon a service rate of reduction in brake pipe pressure for varying the fluid pressure on said application valve device, of means operated upon a reduction in brake pipe pressure at an emergency rate for rendering said equalizing valve device unresponsive to the reduction in brake pipe pressure, and a brake valve device operative in one position to effect a reduction in brake pipe pressure at an emergency rate and adapted in said position to vary the fluid pressure on said application valve device.

20. In a fluid pressure train brake system, the combination with a brake pipe, a reduction in pressure in which operates to apply the brakes on the cars of a train, a brake cylinder on a car of the train, a brake cylinder on the locomotive of the train, a valve device on the car responsive to reductions in brake pipe pressure at service and emergency rates for effecting the delivery of fluid to the brake cylinder on the car, a second fluid pressure actuated valve device on the locomotive for effecting the delivery of fluid to the brake cylinder on the locomotive, a third fluid pressure actuated valve device on the locomotive for controlling the delivery of fluid under pressure to the second valve device, responsive to reductions in brake pipe pressure initiated for effecting operation of the first valve device to effect an application of the brakes, and a manually operable valve means for controlling the delivery of fluid under pressure to the second valve device at a slow rate to initiate an application of the brakes on the locomotive at a slow rate and for making a reduction in brake pipe pressure for effecting an application of the brakes on the car, of a means responsive to a reduction in brake pipe pressure at an emergency rate for rendering the third valve device unresponsive to a reduction of brake pipe pressure.

21. In a fluid pressure train brake system, the combination with a brake pipe, a brake cylinder, a fluid pressure actuated valve device for controlling the delivery of fluid under pressure to the brake cylinder to effect an application of the brakes, a second fluid pressure actuated valve device responsive to a reduction in brake pipe pressure for varying the fluid pressure in said first valve device, and a manually operable valve device for controlling the delivery of fluid under pressure to the first said valve device for effecting operation of the first valve device to initiate an application of the brakes and for effecting reductions in brake pipe pressure at service and emergency rates, of a valve means operative upon a reduction in brake pipe pressure at an emergency rate for rendering the second valve device unresponsive to a reduction in brake pipe pressure.

JOSEPH C. McCUNE.